United States Patent

Braunwieser et al.

[11] 3,712,096
[45] Jan. 23, 1973

[54] GRIPPING HEAD FOR GRIPPING A WORKPIECE TO BE SWAGED

[76] Inventors: Johann Braunwieser, Madlsederstrabe 13, Steyr; Othmar Heimel, Wachtberg 98, Behamberg; Otto Hein, Resselstrabe 16, Steyr, all of Austria

[22] Filed: July 13, 1970

[21] Appl. No.: 54,529

[30] Foreign Application Priority Data

July 28, 1969 Austria.............................A 7242/69

[52] U.S. Cl..........................................72/28, 72/421
[51] Int. Cl....................B21b 37/08, B21d 43/02
[58] Field of Search..........................72/420, 421, 28

[56] References Cited

UNITED STATES PATENTS 3,468,154  9/1969  Hertl......................................72/421
3,274,819  9/1966  Knowles..................................72/421

*Primary Examiner*—Charles W. Lanham
*Assistant Examiner*—R. M. Rogers
*Attorney*—Kurt Kelman

[57] ABSTRACT

A spindle is rotatably mounted in a gripping head body. Gripping jaws are mounted on said spindle for rotation therewith and adapted to grip a workpiece to be swaged by periodic hammer blows. A hydraulic motor is operatively connected to said spindle and operable to rotate the same. Valve means are movable between first and second positions and arranged to control said hydraulic motor to rotate said spindle in a first direction when said valve means are in said first position and in a second direction, which is opposite to the first, when said valve means are in said second position, and valve control means for cyclically moving said valve means between said first and second positions at a cycle frequency which is equal to the frequency of said hammer blows.

9 Claims, 3 Drawing Figures

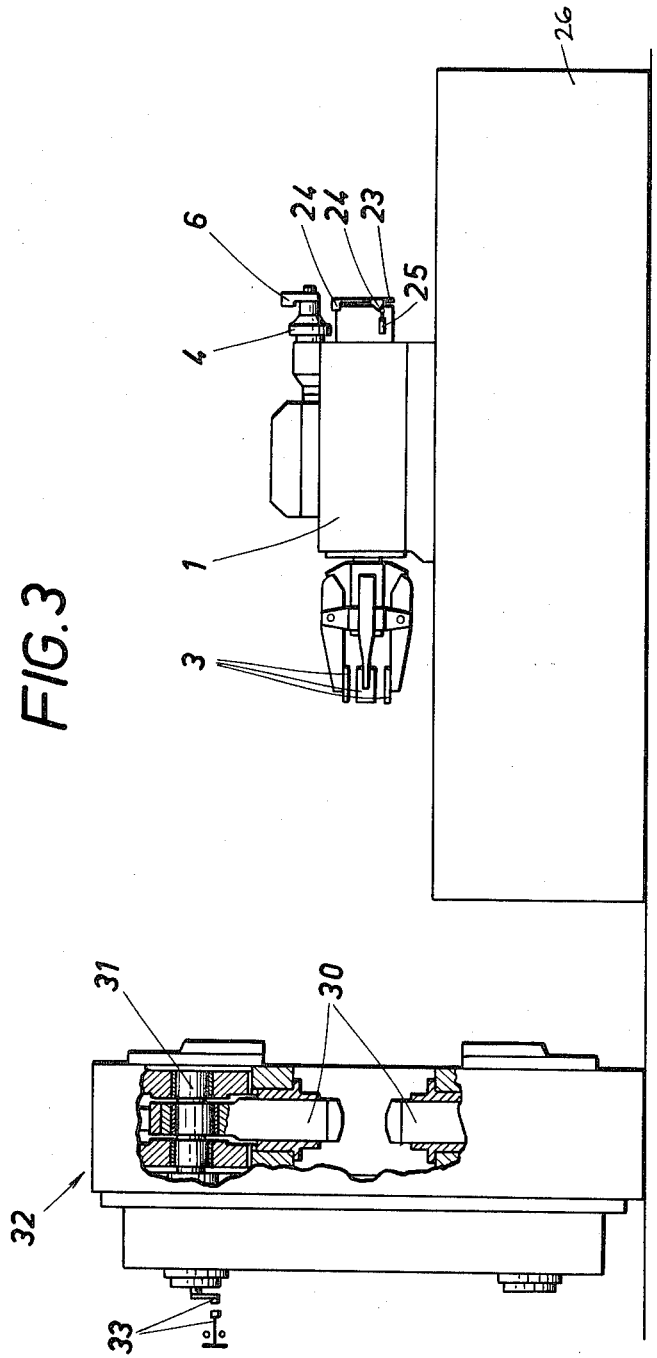

GRIPPING HEAD FOR GRIPPING A WORKPIECE TO BE SWAGED

This invention relates to a gripping head for swaging machines having hammers which are preferably driven by eccentric shafts, in which gripping heads the jaws for gripping the workpiece are secured to a power-driven spindle, which is rotatably mounted in the gripping head.

Such gripping head serves to move the workpiece between the hammers in the direction of the axis of the workpiece and during the swaging of workpieces to a circular cross-section to impart to the workpiece a rotation about its axis. For this purpose, the gripping head is displaceable in the direction of the axis of the workpiece and the gripping head spindle, which carries the jaws, can be driven by a motor. The workpiece is temporarily arrested by each hammer blow so that a uniform drive of the spindle would result in an undesired twisting of the workpiece. For this reason, the known means for driving the spindle comprise a spring system, which permits of torsional vibration and of a braking of the spindle when the workpiece is arrested by the hammer blow. That spring system is so designed that the rotational drive movement imparted to the spindle and the vibrational movement which is caused by the spring system and the periodic arrest of the workpiece result in an automatic arrest of the spindle and of the workpiece at the time of the hammer blow.

It has now been found during the swaging of workpieces which are relatively small in cross-section and torsional strength to a circular cross-section, the torque which is due to the restraining forces of the swaging hammers and which is transmitted by the workpiece to the gripping head spindle are often insufficient to induce the desired vibration in the spring system so that the thin workpiece becomes twisted and must be rejected in spite of the provision of the spring system. It has also been proposed to provide a hydraulically operable brake for the gripping head spindle which is adapted to be driven through the intermediary of a spring system and to apply pressure to said brake intermittently at the frequency of the hammer blows during the swaging of a workpiece to a circular cross-section so that the desired torsional vibration will be produced even if the torsional strength of the workpiece is not sufficient to transmit from the hammers to the spring system the restraining forces which are required to induce the vibrations. Whereas that design has proved satisfactory, it can be used only in gripping heads of swaging machines which are not very large and in which very large forces are not transmitted by the means for driving the gripping head spindle.

For use with swaging machines, manipulators are known which comprise a hydraulic rotary motor for rotating the workpiece about its axis; that hydraulic motor is stopped at each hammer blow. These stoppages involve large losses of energy. Besides, such manipulators cannot be used in high-frequency swaging machines in which the workpiece is rotated at a high speed.

Careful observations of the swaging operations for producing workpieces having a circular cross-section have revealed that the workpiece driven in a given sense of rotation is not only arrested by the hammer blow but the swaging forces comprise components which act on the workpiece in the peripheral direction thereof and tend to rotate it slightly in the opposite direction. Hence, even if the gripping head spindle and the jaws are arrested during the hammer blow at the proper time and for the proper duration, the workpiece can be twisted in a sense which is opposite to the rotational movement normally imparted to the workpiece. These phenomena are not taken into account in the design of any of the known gripping heads.

It is an object of the invention to eliminate the disadvantages which have been set forth and to provide a gripping head which is of the kind defined first hereinbefore and which prevents a twisting of the workpiece to be swaged to a circular cross-section, avoids losses of energy to a large extent, enables the means for driving the gripping head spindle to move the same to predetermined angular positions in the swaging of workpieces to cornered cross-sections, and may be used also in large swaging machines.

That object is accomplished by the invention essentially in that a hydraulic rotary motor is provided in known manner to drive the spindle and a sliding control valve or the like is provided, which is movable at the frequency of the hammer blows and serves to supply hydraulic fluid to the hydraulic motor in opposite directions in alternation. Hence, the means for driving the gripping head spindle no longer include a spring system which enables torsional vibration but the spindle is inherently driven first in one direction, which is the main direction of rotation, whereafter hydraulic liquid is supplied to the hydraulic motor in the opposite sense so that the spindle is not only quickly braked but is driven in the opposite direction. It will be understood that the movement in the opposite direction is imparted to the spindle only for a short time, which coincides with the hammer blow and with the step of shaping the workpiece. Because the gripping head now serves not only to arrest the rotational movement of the workpiece during the hammer blow but actually rotates it in the opposite sense, the rotation imparted to the workpiece as it is deformed can no longer result in a twisting of the workpiece because the end portion of the workpiece held between the jaws follows the small movement in the opposite direction imparted to the workpiece by the hammer. Even workpieces having only a low inherent torsional resistance will not be twisted because the means for driving the gripping head spindle impart to said spindle and to the jaws a vibrational rotational motion, which corresponds exactly to the phenomena taking place during the swaging of a workpiece to a circular cross-section and which is independent of the strength of the workpiece.

In a development of the invention, the control valve has associated therewith a sliding pilot valve, which consists of a solenoid valve having three control positions, and the solenoid coils of the solenoid valve are energizable in alternation by an adjustable pulse generator which is operable by one of the eccentric shafts, the hydraulic motor is connected to the control valve by two conduits serving to supply and drain liquid in alternation, springs tend to hold the control valve in an intermediate position, in which it blocks a pump discharge conduit and a drain conduit, two pilot conduits are connected to both ends of the control valve, and the pilot valve operates in alternation to connect said pilot conduits to a separate discharge conduit and to a separate drain conduit or to short-circuit said pilot conduits. The pilot valve is reciprocated under control of the pulse generator. Because the pulse generator is operated by one of the eccentric shafts or the like, the pilot valve will move in synchronism with the hammer blows. The pulse generator is adjustable and can be adjusted so that the pilot valve and the control valve will be in the position for the reverse rotation of the spindle when the workpiece is being shaped by the hammer blow. When both solenoid coils of the pilot valve are deenergized, the pilot valve is in an intermediate position, in which it short-circuits the conduits leading from the pilot valve to the ends of the control valve and the springs of the control valve hold the latter also in its intermediate position, in which the hydraulic motor is stopped because the control valve blocks the pump discharge conduit and the drain conduit. When the pilot valve is moved from its intermediate position under the control of the pulse generator, hydraulic liquid is supplied to one end of the control valve and liquid can drain from the other end so that the control valve assumes a position which corresponds to the position of the pilot valve. When the control valve is in one of its two end positions, one of the two conduits leading to the hydraulic motor is connected to the pump discharge conduit and the other to the drain conduit so that the hydraulic motor rotates in one direction or the other until the pilot valve induces another shifting of the control valve and the hydraulic motor is operated to rotate in the opposite sense.

In accordance with the invention, two hydraulic accumulators are respectively connected to the pump discharge conduit leading to the control valve and to the drain conduit leading from the control valve, the pump discharge conduit includes a check valve between the pump and the connection to one accumulator and the drain conduit includes a relief valve between the connection to the other accumulator and the outlet of the drain conduit. Whereas the pump discharges at a constant rate, the liquid consumption rate of the hydraulic motor varies as a result of the reversal of said motor. These variations of the liquid consumption rate are compensated by the accumulators so that the liquid required by the motor is supplied not only directly by the pump but also by both accumulators.

The gripping head according to the invention comprises also two by-pass conduits, which lead from the control valve to respective ones of the conduits leading to the hydraulic motor and which are connected by respective check valves to the pump discharge conduit and to the drain conduit between the control valve and the accumulator. These check valves prevent a flow from the pump discharge conduit and into the drain conduit, respectively. The pump discharge conduit and the drain conduit are blocked when the control valve is in its intermediate position as it is shifted from one end position to the other whereas the two by-pass conduits remain open. As the hydraulic motor continues to rotate as a result of inertia, it can receive liquid from the accumulator which is connected to the drain conduit whereas the liquid which is displaced by the motor is received by the accumulator which is connected to the pump discharge conduit. Only when the control valve has reached its other end position and the kinetic energy has been consumed does the motor begin to rotate in the opposite direction and to receive liquid from the accumulator connected to the pump discharge conduit whereas the motor displaces liquid into the accumulator connected to the drain conduit or through the relief valve into the liquid reservoir. In this way, part of the energy supplied to the gripping head spindle can be recovered during the reverse rotation because the motor operates as a pump and supplies liquid into the accumulator during the brake operation. It will be sufficient if the pump can compensate the losses which are due to friction and to fluid flow and the energy requirement is relatively small. The speed of the spindle will depend on the pressure in the hydraulic system. The extent of the rotational movement per hammer blow can be influenced by a selection of the periods of forward and reverse rotation by the pulse generator.

According to another feature of the invention, a disc arranged to rotate in unison with the gripping head spindle comprises cams having oblique run-up surfaces and arranged to actuate a limit switch so as to energize the solenoid coils of an additional sliding solenoid valve by which the two conduits leading to the hydraulic motor are directly connected to the pump discharge conduit and to a drain conduit incorporating a flow control device, or are blocked, when the control valve is in its intermediate or blocking position. Under the control of that additional solenoid valve, the gripping head spindle may be rotated to an angular position which depends on the respective next cam so that in the swaging of a workpiece to a square or rectangular or the like cross-section the workpiece can be moved to a predetermined angular position relative to the hammers. The extent of the slow-down movement is selected so that the limit switch will remain engaged with the oblique run-up surface of the cam. If swaging forces transmitted by the workpiece then rotate the gripping head spindle in one direction or the other against the torque resistance presented by the motor, the solenoid valve will be shifted again and the motor will be operated in the opposite direction until the desired angular position is resumed.

In accordance with the invention, the two conduits leading to the hydraulic motor are interconnected by relief valves. These relief valves prevent damage to the hydraulic motor by peak pressures occurring during a reversal and will respond also when swaging forces transmitted by the workpiece exceed the torque resistance presented by the stopped motor.

The invention is shown by way of example on the accompanying drawing, in which

FIG. 3 shows a conventional forging machine in association with the gripping head assembly of FIG. 1.

Figure 1:
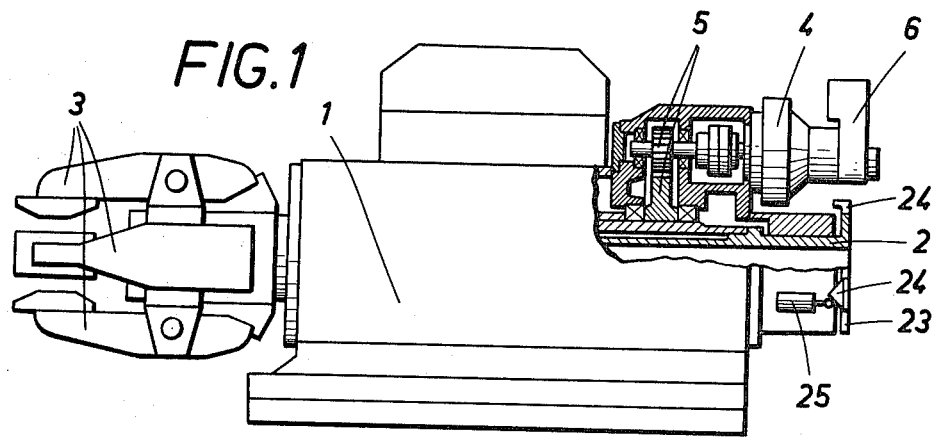
FIG. 1 is a side elevation, partly in section, showing a gripping head.

A hollow spindle 2 is rotatably mounted in the gripping head 1. Jaws 3 for gripping a workpiece are secured to the spindle 2. A low-speed hydraulic rotary motor 4 drives the spindle 2 by a train of two spur gears 5. The gripping head 1 is slidably mounted on a gripping head bed 26, as shown in FIG. 3, for reciprocation in a direction which is parallel to the axis of the spindle and moves the workpiece gripped by the jaws 3 to extend between the hammers 30 of a swaging machine 32. The hammers of the machine are driven by eccentric shafts 31 to move radially toward and from the workpiece.

Figure 2:
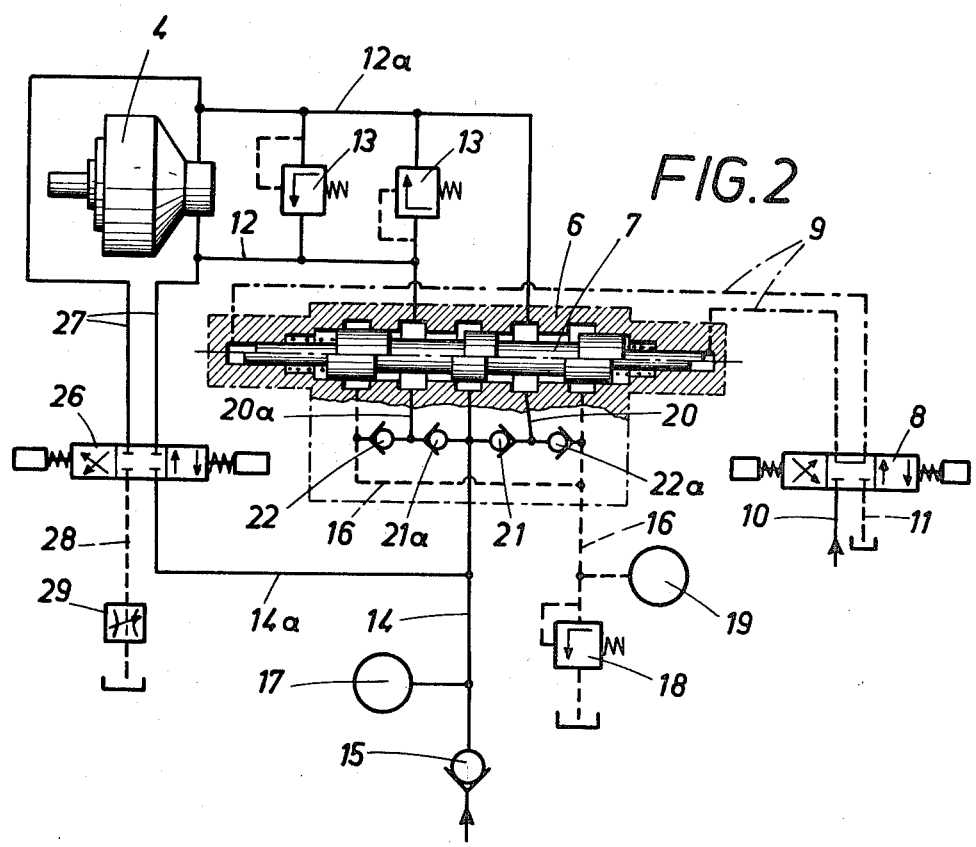
FIG. 2 is a circuit diagram of the associated hydraulic system.

The hydraulic motor 4 is operable to rotate alternately in one direction and the other and is controlled by various sliding and other valves, which are accommodated in a control block 6. That control block 6 comprises as its main component a sliding control valve 7 (FIG. 2), with which a sliding pilot valve 8 is associated. The pilot valve 8 consists of a solenoid valve having three control positions and comprising solenoid coils which are energizable in alternation by a pulse generator 33, which is operable by one of the eccentric shafts for driving the hammers. For this purpose, one eccentric shaft 31 has affixed thereto a radially extending contact arm rotating with the shaft and producing a pulse per shaft rotation to energize the coils of valve 8. Two conduits 9 lead from the pilot valve 8 to respective ends of the control valve 7, which is provided with springs tending to hold the control valve in an intermediate position, which is indicated in FIG. 2 for the lower portion of the valve whereas one of the two end positions of the valve is shown for the upper half of the valve. The pilot valve 8 is shown in its intermediate position, in which it short-circuits the two conduits 9 and causes the control valve 7 also to assume its intermediate position. When either of the solenoid coils of the pilot valve is energized to shift the pilot valve from its intermediate position to one side or the other, one of the conduits 9 is connected to a pump discharge conduit 10 and the other conduit 9 is connected to a drain conduit 11 so that the control valve 7 is shifted in one direction or the other.

The hydraulic motor 4 is connected by two conduits 12, 12a to the housing of the control valve 7. These conduits serve to operate the motor in mutually opposite directions and are interconnected by relief valves 13. A pump discharges hydraulic liquid through a conduit 14 and a check valve 15 to the control valve 7. A drain conduit is indicated at 16. In the discharge conduit 14, the check valve 15 is succeeded by a connection to hydraulic accumulator 17. In the drain conduit 16, a relief valve 18 is preceded by a connection to another hydraulic accumulator 19. The hydraulic system includes two by-pass conduits 20, 21, which by respective check valves 21, 21a and 22, 22a are connected to the pump discharge 14 and to the drain conduit 16.

When no signal is applied by the pulse generator to the solenoid coils of the pilot valve 8, the control valve 7 will be held in its intermediate position, which is shown for the lower half of that valve and in which the pump discharge conduit 14 and the drain conduit 16 are blocked and the motor 4 is stopped. The pump now discharges into the accumulator 17. When the pulse generator then energizes one of the solenoid coils of the pilot valve 8 to shift the latter, e.g., to the right, the control valve 7 will also be shifted to its right-hand end position shown for the upper half of that valve. Hydraulic liquid can now flow from the pump and from the accumulator 17 through conduits 14 and 12 to the hydraulic motor 4, which begins to rotate and displaces liquid through conduits 12a and 16 into the accumulator 19. When the latter is full, the displaced liquid flows through the valve 18 back into the liquid reservoir. The succeeding shifting of the pilot valve 8 in the opposite direction causes a shift of the control valve 7 to its left-hand end position. When the control shift assumes its intermediate position during that shift, the conduits 14 and 16 will be blocked whereas the by-pass conduit 20, 20a will remain in communication with the conduits 12, 12a. As soon as the inlet pressure of the motor (conduit 12) has been reduced below the pressure in the conduit 16, which is connected to the accumulator 19, liquid can flow from the accumulator 19 through the check valve 22 and the by-pass conduit 20a to the hydraulic motor 4, which continues to rotate under the action of inertia and displaces liquid through conduits 12a and 20, the check valve 21 and the conduit 14 into the accumulator 17. When the control valve 7 has reached its left-hand end position, it will connect the pump discharge conduit 14 to the conduit 12a connected to the motor and will connect the drain conduit 16 to the conduit 12 connected to the motor. The operation of the motor to deliver liquid into the accumulator 17 and to draw liquid from the accumulator 19 will be continued until the kinetic energy has been consumed and a rotation of the motor in the opposite sense is initiated while the motor receives liquid from the accumulator 17 and displaces liquid into the accumulator 19 or through valve 18 into the liquid reservoir. Another shift of the pilot valve 8 will result in another shift of the control valve 7 so that the same operations will be performed in the opposite direction and the check valves 21a, 22a will become effective.

The gripping head spindle 2 carries a disc 23, which is provided with cams 24 with an angular spacing of 90° or 45°. The cams 24 have oblique run-up surfaces and operate a limit switch 25. The latter is operable to initiate the energization of the solenoids of an additional sliding solenoid valve 26, which is connected by conduits 27 to the conduits 12, 12a leading to the hydraulic motor 4. The solenoid valve 26 is operable to connect either of the conduits 12, 12a directly to a branch conduit 14a connected to the pump discharge conduit 14 and to connect the other of the conduits 12, 12a to a drain conduit 28, which is provided with a flow control device 29. When it is desired to swage a workpiece to a square or rectangular cross-section or to swage down the edges of a square workpiece to form an octagonal cross-section, the gripping head spindle 2 must not rotate during the operation but the workpiece must be moved to a predetermined angular position relative to the hammers. In that case, the gripping head according to the invention serves to index the workpiece. For an indexing operation, the pilot valve 8 and the control valve 7 are in their intermediate position. The additional solenoid valve 26 is so shifted under control of a suitable electric signal that the motor 4 is supplied with hydraulic liquid through either of the conduits 12, 12a and rotates the gripping head spindle 2 in one direction or the other. This rotation will be continued until the next cam 24 operates the limit switch 25 so that the latter permits the solenoid valve 26 to move to its intermediate position. The extent of the slow-down movement is selected so that the limit switch 25 remains in engagement with the oblique run-up surface of the respective cam 24. When swaging forces transmitted by the workpiece rotate the gripping head spindle in one direction or the other against the torque resistance presented by the hydraulic motor 4, liquid will flow through one of the relief valve 13, the limit switch 25 will permit of a reenergization of the solenoid coils of the solenoid valve 26 and the motor will rotate in the opposite sense until the desired indexing position has been reached.

What is claimed is:

1. A gripping head for gripping a workpiece to be swaged by periodical hammer blows, which gripping head comprises
    a gripping head body,
    a spindle rotatably mounted in said gripping head body,
    gripping jaws mounted on said spindle for rotation therewith and adapted to grip a workpiece,
    a hydraulic motor operatively connected to said spindle and operable to rotate the same,
    a sliding control valve means movable between first and second positions and arranged to control said hydraulic motor to rotate said spindle in a first direction when said control valve means are in said first position and in a second direction, which is opposite to the first, when said valve means are in said second position, and valve control means for cyclically moving said control valve means between said first and second positions at a cycle frequency which is equal to the frequency of the hammer blows, the valve control means comprising a pilot valve consisting of a solenoid valve tending to assume an intermediate position and movable to first and second end positions from said intermediate position, a first solenoid coil energizable to move said pilot valve to said first end position, a second solenoid coil energizable to move said pilot valve to said second end position, means comprising an adjustable pulse generator for energizing said solenoid coils in alternation to move said pilot valve between said first and second end positions at a cycle frequency which is equal to the frequency of said hammer blows, a pump discharge conduit, a drain conduit, and first and second pilot conduits connected to opposite ends of said control valve, and in which said pilot valve is arranged to connect said first pilot conduit to said pump discharge conduit and said second pilot conduit to said drain conduit in said first end position, to connect said second pilot conduit to said pump discharge conduit and said first pilot conduit to said drain conduit in said second end position, and to short-circuit said first and second pilot conduits in said intermediate position, spring means are provided which tend to move said control valve to an intermediate position, said control valve is adapted to move against the action of said spring means to its said first position in response to the application of pressure through said first pilot conduit and draining of liquid through said second pilot conduit, and to said second position in response to the application of pressure through said second pilot conduit and draining of liquid through said first pilot conduit, a second pump discharge conduit and a second drain conduit are provided, and said control valve is arranged to connect said second conduits to said hydraulic motor for operation in one direction in said first position of said control valve, and for operation in another direction, which is opposite to said one direction, in said second position of said control valve, and to block both said second conduits in said intermediate position of said control valve.

2. A gripping head for gripping a workpiece to be swaged by periodic hammer blows, which gripping head comprises
    a gripping head body,
    a spindle rotatably mounted in said gripping head body,
    gripping jaws mounted on said spindle for rotation therewith and adapted to grip a workpiece,
    a hydraulic motor operatively connected to said spindle and operable to rotate the same,
    valve means movable between first and second positions and arranged to control said hydraulic motor to rotate said spindle in a first direction when said valve means are in said first position and in a second direction, which is opposite to the first, when said valve means are in said second position,
    a pump discharge conduit and a drain conduit arranged to be connected to said motor in said first and second positions of said valve means,
    a check valve incorporated in said pump discharge conduit,
    a hydraulic accumulator connected to said pump discharge conduit at a point between said check valve and said valve means,
    a relief valve incorporated in said drain conduit,
    a hydraulic accumulator connected to said drain conduit at a point between said valve means and said relief valve, and
    valve control means for cyclically moving said valve means between said first and second positions at a cycle frequency which is equal to the frequency of said hammer blows.

3. A gripping head as set forth in claim 2, which comprises
    a first motor conduit connected to said pump discharge conduit in said first position of said valve means and to said drain conduit in said second position of said valve means,
    a second motor conduit connected to said drain conduit in said first position of said valve means and to said pump discharge conduit in said second position of said valve means,
    said first and second motor conduits being permanently connected to said motor,
    first and second check valves connected between said pump discharge conduit and said first and second motor conduits, respectively, and preventing a flow from said pump discharge conduit into said motor conduits, and
    third and fourth check valves connected between said drain conduit and said first and second motor conduits, respectively, and preventing a flow from said motor conduits into said drain conduit.

4. A swaging machine which comprises
    a gripping head for gripping a workpiece,
    hammers operable to swage said workpiece by periodic hammer blows, and hammer drive means operable to operate said hammers,
said gripping head comprising
a gripping head body,
a spindle rotatably mounted in said gripping head body,
gripping jaws mounted on said spindle for rotation therewith and adapted to grip a workpiece,
a hydraulic motor operatively connected to said spindle and operable to rotate the same,
valve means movable between first and second positions and arranged to control said hydraulic motor to rotate said spindle in a first direction when said valve means are in said first position and in a second direction, which is opposite to the first, when said valve means are in said second position, and
valve control means for cyclically moving said valve means between said first and second positions at a cycle frequency which is equal to the frequency of said hammer blows,
said valve control means being controlled by said hammer drive means.

5. A gripping head for gripping a workpiece to be swaged by periodic hammer blows, which gripping head comprises
a gripping head body,
a spindle rotatably mounted in said gripping head body,
gripping jaws mounted on said spindle for rotation therewith and adapted to grip a workpiece,
a hydraulic motor operatively connected to said spindle and operable to rotate the same,
valve means movable between first and second positions and arranged to control said hydraulic motor to rotate said spindle in a first direction when said valve means are in said first position and in a second direction, which is opposite to the first, when said valve means are in said second position,
valve control means for cyclically moving said valve means between said first and second positions at a cycle frequency which is equal to the frequency of said hammer blows,
a pump discharge conduit,
a first drain conduit,
a second drain conduit incorporating a flow control device,
a first motor conduit connected to said pump discharge conduit in said first position of said valve means and to said first drain conduit in said second position of said valve means,
a second motor conduit connected to said first drain conduit in said first position of said valve means and to said pump discharge conduit in said second position of said valve means,
said first and second motor conduits being permanently connected to said motor,
a sliding solenoid valve, which tends to assume an intermediate position and is movable to first and second positions, an in said position connects said first motor conduit to said pump discharge conduit and said second motor conduit to said second drain conduit, in said second position connects said second motor conduit to said pump discharge conduit and said first motor conduit to said second drain conduit, and in said intermediate position blocks said motor conduits,
a disc mounted on said spindle for rotation therewith and having cams formed with oblique run-up surfaces,
first and second solenoid coils associated with said solenoid valve and energizable to move said solenoid valve to said first and second positions, respectively, and
a limit switch which is engageable by said run-up surfaces and arranged to de-energize said solenoid coils in response to such engagement.

6. A gripping head for gripping a workpiece to be swaged by periodic hammer blows, which gripping head comprises
a gripping head body,
a spindle rotatably mounted in said gripping head body,
gripping jaws mounted on said spindle for rotation therewith and adapted to grip a workpiece,
a hydraulic motor operatively connected to said spindle and operable to rotate the same,
valve means movable between first and second positions and arranged to control said hydraulic motor to rotate said spindle in a first direction when said valve means are in said first position and in a second direction, which is opposite to the first, when said valve means are in said second position,
valve control means for cyclically moving said valve means between said first and second positions at a cycle frequency which is equal to the frequency of said hammer blows,
a pump discharge conduit,
a drain conduit,
a first motor conduit connected to said pump discharge conduit on said first position of said valve means and to said first drain conduit in said second position of said valve means,
a second motor conduit connected to said first drain conduit in said first position of said valve means and to said pump discharge conduit in said second position of said valve means,
a first relief valve connected between said first and second motor conduits and responsive to a predetermined pressure in said first motor conduit, and
a second relief valve connected between said first and second motor conduits and responsive to a predetermined pressure in said second motor conduit.

7. A swaging machine which comprises
a gripping head for gripping a workpiece,
hammers operable to swage said workpiece by periodic hammer blows, and
hammer drive means comprising eccentric shafts and operable to operate said hammers,
said gripping head comprising
a gripping head body,
a spindle rotatably mounted in said gripping head body,
gripping jaws mounted on said spindle for rotation therewith and adapted to grip a workpiece,
a hydraulic motor operatively connected to said spindle and operable to rotate the same, valve means movable between first and second positions and arranged to control said hydraulic motor to rotate said spindle in a first direction when said valve means are in said first position and in a second direction, which is opposite to the first, when said valve means are in said second position, and valve control means for cyclically moving said valve means between said first and second positions at a cycle frequency which is equal to the frequency of said hammer blows, said valve control means being controlled by one of said eccentric shafts.

8. A swaging machine which comprises
a gripping head for gripping a workpiece,
hammers operable to swage said workpiece by periodic hammer blows, and
hammer drive means operable to operate said hammers,
said gripping head comprising
a gripping head body,
a spindle rotatably mounted in said gripping head body,
gripping jaws mounted on said spindle for rotation therewith and adapted to grip a workpiece,
a hydraulic motor operatively connected to said spindle and operable to rotate the same,
a sliding control valve movable between first and second positions and arranged to control said hydraulic motor to rotate said spindle in a first direction when said valve means are in said first position and in a second direction, which is opposite to the first, when said valve means are in said second position, and
valve control means for cyclically moving said valve means between said first and second positions at a cycle frequency which is equal to the frequency of said hammer blows,
said valve control means being controlled by said hammer drive means and comprising
a pilot valve consisting of a solenoid valve tending to assume an intermediate position and movable to first and second end positions from said intermediate position,
a first solenoid coil energizable to move said pilot valve to said first end position,
a second solenoid coil energizable to move said pilot valve to said second end position, means comprising an adjustable pulse generator for energizing said solenoid coils in alternation to move said pilot valve between said first and second end positions at a cycle frequency which is equal to the frequency of said hammer blows, a pump discharge conduit,
a drain conduit, and
first and second pilot conduits connected to opposite ends of said control valve, and in which said pilot valve is arranged to connect said first pilot conduit to said pump discharge conduit and said second pilot conduit to said drain conduit in said first end position, to connect said second pilot conduit to said pump discharge conduit and said first pilot conduit to said drain conduit in said second end position, and to short-circuit said first and second pilot conduits in said intermediate position, spring means are provided which tend to move said control valve to an intermediate position, said control valve is adapted to move against the action of said spring means to its said first position in response to the application of pressure through said first pilot conduit and draining of liquid through said second pilot conduit, and to said second position in response to the application of pressure through said second pilot conduit and draining of liquid through said first pilot conduit, a second pump discharge conduit and a second drain conduit are provided, said control valve is arranged to connect said second conduits to said hydraulic motor for operation in one direction in said first position of said control valve, and for operation in another direction, which is opposite to said one direction, in said second position of said control valve, and to block both said second conduits in said intermediate position of said control valve, and said pulse generator is controlled by said hammer drive means.

9. A swaging machine as set forth in claim 8, in which said hammer drive means comprise eccentric shafts and
said pulse generator is controlled by one of said eccentric shafts.

* * * * *